Figure 1:
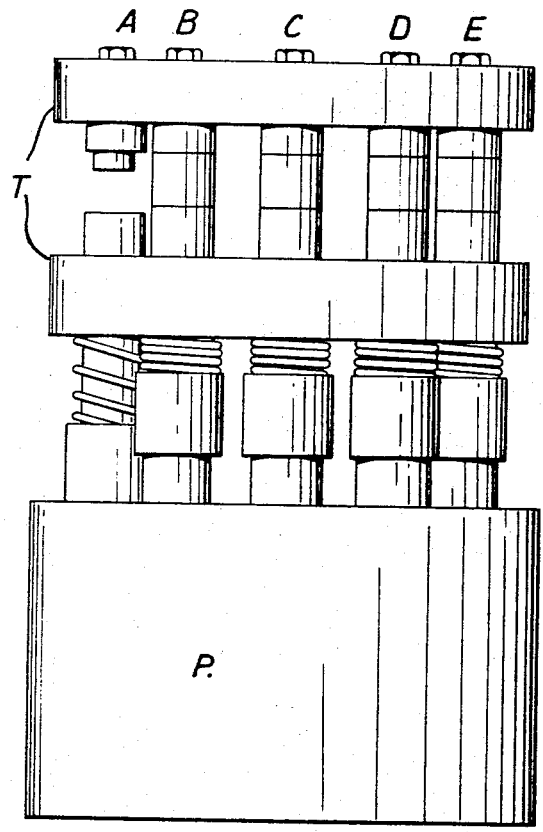

Aug. 29, 1967 E. T. JAGGER ET AL 3,337,920

MULTIPLE DIE PRESS APPARATUS

Filed Sept. 18, 1964 2 Sheets-Sheet 1

United States Patent Office 3,337,920
Patented Aug. 29, 1967

3,337,920
MULTIPLE DIE PRESS APPARATUS
Ernest T. Jagger and Edward I. Hunter, Newcastle-upon-Tyne, England, assignors to George Angus & Company Limited, Newcastle-upon-Tyne, England
Filed Sept. 18, 1964, Ser. No. 397,440
Claims priority, application Great Britain, Sept. 24, 1963, 37,559/63
5 Claims. (Cl. 18—20)

This invention relates to moulding articles and provides a machine particularly, but not exclusively, for moulding articles from plastic material such as natural or synthetic rubber.

The invention is applied to moulding in dies which are moved, such as by an endless conveyor along a closed path or on a turntable or other rotary carrier, either step-by-step or continuously while a sequence of die-loading, die-closing, die-opening and die-unloading operations is carried out during such movement.

Acording to the invention, in an apparatus for carrying out such moulding, the sequence of operations comprises loading a die, closing the die under a given first pressure, venting the die, such as by a slight opening or so-called "bumping" thereof, applying a second and higher given closing pressure to the die and maintaining such higher pressure until die-opening for unloading. The venting step might not be an essential step for moulding some materials and in such case could be omitted.

Preferably, the invention is employed in a multiple die machine or apparatus having pairs of dies on a turntable carrier which is moved step-by-step past stations at which the several sequential operations are carried out.

The stations comprise:

(A) A loading station at which each pair of a series of spring-loaded pairs of dies is opened and receives a blank or other charge of plastic material. The dies are spring-loaded to open.

(B) An initial closing station at which the pair of dies is closed to a given pressure, such as by a hydraulic press controlled by a relief valve.

(C) A second closing, or increased-pressure, station at which the pressure applied to the pair of dies is increased, such as by a second hydraulic press with a controlling relief valve set to a higher load, and (Z) A final die-opening and discharge station at which the moulded article is removed or ejected.

Between stations B and C there may be provided venting means such as a roller cam which momentarily opens a valve maintaining hydraulic pressure on the pair of dies.

A similar roller cam may be provided at the final station Z to open the same valve to release the hydraulic pressure to allow the pair of dies to open, under its spring-loading, before passing again to station A.

The advantage of the operational sequence provided by the invention is that the first pressure applied to the dies, at station B, can be a relatively low pressure at which the plastic material can flow to conform to the die cavity slowly and without undesirable impulse surges. This is important in articles which have metal or other rigid inserts moulded in them, such as oil seals with metal ring inserts, and which are liable to be distorted by a high moulding pressure rapidly applied.

Under the low pressure, at station B, the plastic material almost completely fills the die cavity. The second pressure, at station C, can be the ultimate pressure required to fill the die cavity completely and this can safely be applied to the material which already very nearly conforms to the die cavity.

In accordance with usual practice, the dies may be heated during their movement from station C to station Z, for rubber vulcanisation for example, and the times and speed of movement of the dies may be controlled to suit the material and articles moulded.

Figure 2:
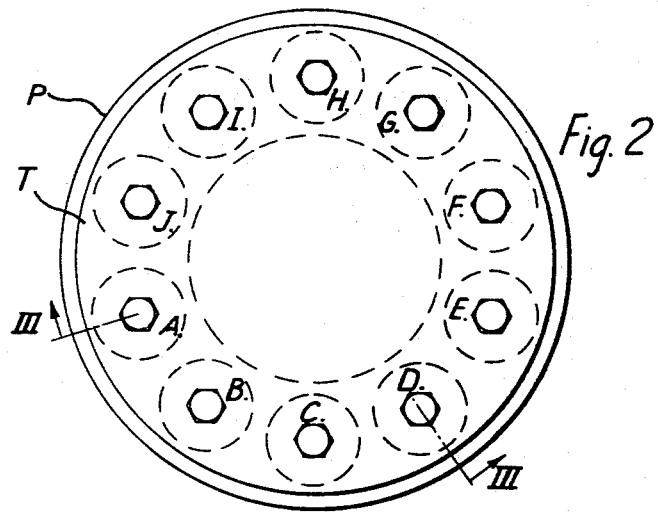
Figure 3:
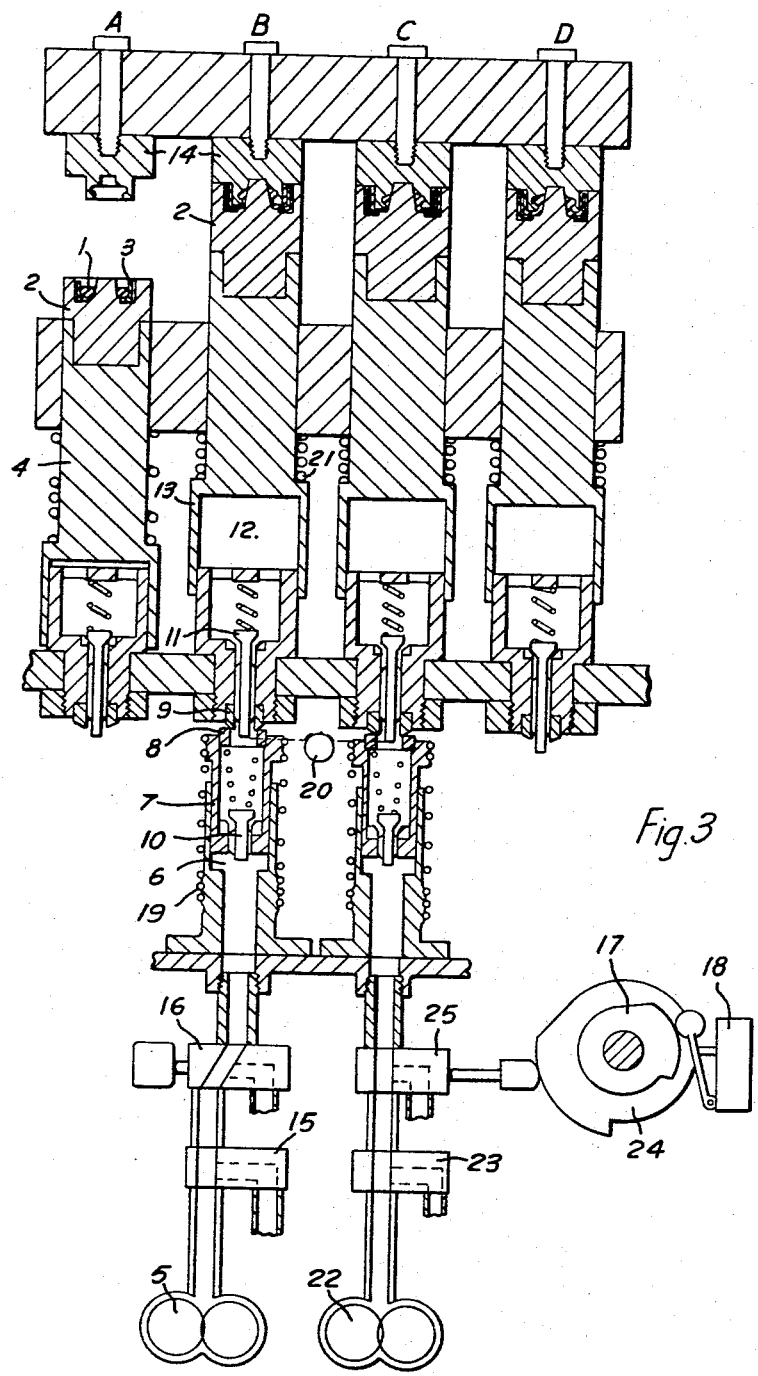

A machine in accordance with the invention, for moulding rubber shaft seals with metal insert rings, is illustrated, by way of example, on the accompanying drawing, in which:

FIG. 1 is a side elevation of the machine,
FIG. 2 is a plan thereof and
FIG. 3 is a somewhat schematic vertical section on the line III—III of FIG. 2.

The machine shown by FIGS. 1 and 2 comprises 10 moulding presses A to J, each incorporating a pair of dies, mounted in a turntable T on a pedestal base P in which is provided mechanism for turning the frame T and operating the presses.

By a step-by-step drive, such as a ratchet drive (not shown), the table T is indexed through steps of 36° after each of which the table stops for a pre-determined time to allow for blank loading, press closing and mould unloading of each individual press at respective stations in the pedestal P at which those functions are performed.

The invention is primarily concerned with the functions performed at stations which are occupied by the presses A, B and C in FIG. 2 and a description of those functions will now be given with reference to FIG. 3 and using A, B and C to designate the stations.

In the press at station A, an uncured rubber blank 1 is placed, either by hand or by mechanical means, into a bottom moulding die 2 along with a metal insert 3.

The press assembly 4 is then indexed to station B and hydraulic fluid under low pressure from a gear pump 5 is fed to a cylinder 6 in which a piston 7 moves upward under the hydraulic pressure and clamps a valve seat 8 against a nozzle 9 to make a pressure-tight seal. Further increase in fluid pressure, from the pump 5, causes a valve 10 to open and in turn a valve 11 to open. Oil then enters a piston chamber 12 in a skirt of a plunger 13 which is forced upwards, causing the bottom moulding die 2 to approach a top moulding die 14. As the two moulding dies 2 and 14 come together, the uncured rubber blank 1 is made to flow around the metal insert 3 and, because the hydraulic pressure is relatively low, the flow of the rubber is relatively slow and free from impulse surges. Because of this, the pressures on the inside walls of the insert 3 are not high enough to cause the insert to bulge outwards, this being a difficulty which occurs when dies are closed under high pressure.

When the hydraulic pressure reaches a given value, a relief valve 15 automatically by-passes the fluid delivery from the pump 5, to a reservoir, and the pressure in the system above is maintained by closing of an electrically operated solenoid valve 16.

After a given time, during which the dies are held closed, a cam 17, on a machine-controlling cam shaft, operates a switch 18 which opens the solenoid valve 16 and releases the hydraulic fluid which commences to flow back to the reservoir. Becasuse this causes a sudden loss of pressure, the valve 11 closes immediately, locking the fluid in the chamber 12 at the required pressure. Fluid in the cylinder 6 returns to the reservoir through the valves 16 and 15, and a return spring 19 on the piston 7 withdraws the valve seat 8 from the nozzle 9 so that the press assembly is free to be moved to station C.

In order that any air trapped in the dies during closing will not cause a fault on the moulding, the dies are "bumped," i.e., opened again momentarily to allow the air to escape. To perform this function, the valve 11 is forced open momentarily by a cam roller 20 as the press assembly is moved from station B to station C. The cam roller 20 is stationary but is positioned so that the valve 11 must rise to pass over it. This action allows a small amount of fluid to escape through the valve 11 from the chamber 12 and, due to an opening load exerted by a spring 21, the dies part a very small amount.

When the press assembly reaches station C it is connected, in the same way as described above for station B, to a hydraulic pressure supply from a second gear pump 22 which supplies fluid at high pressure for final loading of the dies at the pressure necessary for satisfactory mouldings to be produced. The pressure required at this station is controlled by a relief valve 23 and, following a pre-determined time, a cam 24 depresses a valve 25 to allow release of pressure from the system and the press assembly becomes disconnected in the same way as described above for station B.

Following the action at station C the press assembly indexes to station D and then step-by-step to station I while successive pairs of dies are repeating the operations at stations A, B and C. Whilst indexing from station I to station J a cam (not shown), similar to the cam 20, opens the valve 11 and frees all the fluid from the chamber 12 and, by the action of the spring 21, the dies are opened by the time the respective press assembly reaches station J where the finished moulding is unloaded.

We claim:

1. In a moulding machine comprising a plurality of cooperating pairs of dies, means for moving said pairs of dies in discrete steps to a series of work stations, means at a first one of said stations for positioning the said pairs of dies successively for loading with material to be moulded, means at a subsequent one of said stations for positioning said pairs of dies successively for unloading the moulded articles from said pairs of dies, the improvement which comprises, a fluid actuated means associated with each said pair of dies for exerting a pressure tending to urge said cooperating pairs of dies together, a first pressure source means at a second one of said stations for successively applying to the fluid actuated means a first closing pressure, a second pressure source means at a third one of said stations for applying to said fluid actuated means a second and higher given pressure, and means associated with each said fluid actuated means, respectively, for maintaining said first pressure in said fluid actuated means after the said fluid actuating means has moved away from the said second station and has become disassociated from said first pressure source.

2. In a moulding machine as claimed in claim 1, further including a means for maintaining the said second pressure in the said fluid actuating means after the said fluid actuated means has moved away from the said third station and become disassociated from the said second pressure source, and until the said pair of dies reaches the said subsequent unloading position.

3. A moulding machine according to claim 1, in which each said cooperating pair of dies have spring means constantly tending to separate the pairs thereby opening the dies and including, between said second and third stations, means for momentarily relieving said first pressure to allow the dies of each said pair of dies momentarily to open under the influence of said spring means.

4. A moulding machine according to claim 1 and having a turntable in which said pairs of dies are mounted, a pedestal on which said turntable is rotatably mounted, said fluid actuated means comprising a hydraulic plunger means on each of said pairs of dies for closing said dies, each said hydraulic plunger means incorporating nozzle means for admitting hydraulic fluid thereto and valve means for retaining said fluid under pressure therein, hydraulic pump means in said pedestal at said second and third stations respectively, and said pump means each having valve means to engage each said nozzle means successively.

5. A moulding machine according to claim 4, including spring means on each said pair of dies constantly tending to separate said cooperating pairs of dies thereby opening said dies, and abutment means mounted in said pedestal between said second and third stations momentarily opening said valve means of each said hydraulic plunger means.

References Cited

UNITED STATES PATENTS

| | | | |
|---|---|---|---|
| 2,875,471 | 3/1959 | Crowther | 18—20 |
| 2,904,835 | 9/1959 | Thomas | 18—20 |

J. SPENCER OVERHOLSER, *Primary Examiner.*

E. MAR, *Assistant Examiner.*